(12) United States Patent
Ruiz

(10) Patent No.: US 11,542,839 B2
(45) Date of Patent: Jan. 3, 2023

(54) SYSTEM AND PROCESS FOR ELECTRICITY GENERATION USING STEAM PRODUCTION BY HYDROGEN COMBUSTION

(71) Applicant: Roberto Ruiz, Sammamish, WA (US)

(72) Inventor: Roberto Ruiz, Sammamish, WA (US)

(*) Notice: Subject to any disclaimer, the term of this patent is extended or adjusted under 35 U.S.C. 154(b) by 0 days.

(21) Appl. No.: 17/365,762

(22) Filed: Jul. 1, 2021

(65) Prior Publication Data

US 2022/0003130 A1 Jan. 6, 2022

Related U.S. Application Data

(60) Provisional application No. 63/047,336, filed on Jul. 2, 2020.

(51) Int. Cl.
*F01K 23/10* (2006.01)
*F01K 11/02* (2006.01)
(Continued)

(52) U.S. Cl.
CPC ............ *F01K 23/103* (2013.01); *F01K 11/02* (2013.01); *F01K 23/18* (2013.01); *F01K 25/005* (2013.01); *F05D 2220/76* (2013.01)

(58) Field of Classification Search
CPC ........ F01K 23/103; F01K 11/02; F01K 23/18; F01K 25/005; F05D 2220/76; Y02P 20/129; F22B 1/003
(Continued)

(56) References Cited

U.S. PATENT DOCUMENTS 6,321,539 B1* 11/2001 Bronicki .................. F02C 6/18
60/671
7,546,732 B2* 6/2009 Glasgow ................. F23C 99/00
60/677
(Continued)

FOREIGN PATENT DOCUMENTS

DE 102007058131 A1 9/2008
DE 102012016805 A1 2/2014
(Continued)

OTHER PUBLICATIONS

"PCT/US2021/040163, International Search Report and Written Opinion dated Dec. 23, 2021".

*Primary Examiner* — Hoang M Nguyen
(74) *Attorney, Agent, or Firm* — Crowe & Dunlevy, P.C.

(57) ABSTRACT

The invention relates to a system and process for electricity generation using steam production by hydrogen combustion, and more particularly to a Rankine Cycle system and process for the generation of electricity using a primary pure hydrogen fuel source for the generation of steam in the boiler system. The Rankine Cycle system and process may also use one or more secondary fuel sources in combination with the primary hydrogen fuel source to supplement the primary pure hydrogen fuel if necessary. Additionally, the inventive system and process can use a flame temperature reducing fluid for lowering bulk flame temperature of a burner in the boiler system to increase equipment life and decrease equipment failure. The inventive Rankine Cycle system and process reduce emissions of carbon dioxide, nitrogen oxides, and other greenhouse gases into the atmosphere, and reduce bulk flame temperatures to increase equipment life and decrease equipment failure.

45 Claims, 13 Drawing Sheets

(51) Int. Cl.
*F01K 23/18* (2006.01)
*F01K 25/00* (2006.01)

(58) Field of Classification Search
USPC .................................................. 60/670–683
See application file for complete search history.

(56) References Cited

U.S. PATENT DOCUMENTS

| | | | |
|---|---|---|---|
| 2017/0218284 A1* | 8/2017 | Liss | C10K 1/34 |
| 2017/0271701 A1* | 9/2017 | Berlowitz | H01M 8/249 |
| 2018/0080379 A1* | 3/2018 | Conlon | F02C 1/02 |

FOREIGN PATENT DOCUMENTS

| | | | |
|---|---|---|---|
| JP | H03258902 A | 11/1991 | |
| JP | H08254107 A | 10/1996 | |

\* cited by examiner

SYSTEM AND PROCESS FOR ELECTRICITY GENERATION USING STEAM PRODUCTION BY HYDROGEN COMBUSTION

CROSS REFERENCE TO RELATED APPLICATIONS

This application claims the benefit of U.S. Provisional Patent Application No. 63/047,336 filed on Jul. 2, 2020. This application incorporates the foregoing application by reference into this document as if fully set out at this point.

BACKGROUND OF THE INVENTION

Field of the Invention

This invention relates generally to a system and process for electricity generation using steam production by hydrogen combustion.

2. DESCRIPTION OF THE RELATED ART

Concerns regarding the depletion of non-renewable energy sources in the middle of last century initiated a government and industry drive towards research, development, and implementation of renewable technologies, such as solar, wind, hydro-electric and geothermal energy. The availability of inexpensive carbon-based fuels, however, limited the wide implementation of renewable energy as it could not compete effectively with traditional fuels. Government grants and subsidies for renewable energy sources helped maintain interest in research and development and electricity supply, but inroads in the overall energy market were modest at best.

More recently, concerns related to the ever-increasing concentration of carbon dioxide ($CO_2$) in the atmosphere, a byproduct from the burning of coal and hydrocarbon fuels, and carbon dioxide's impact as a greenhouse gas on climate change, have established a sense of urgency that prompted many nations to start curbing and/or replacing the use of these fuels for electricity generation with renewable energy technologies as those mentioned above. In addition, great strides in the conversion efficiency and economics of solar and wind energy that have been made in the recent past have helped them gain wider acceptance and become a more viable and economic replacement option.

Unfortunately, the inherent non-continuous supply of solar and wind power for electricity generation presents a challenge requiring carbon-based electricity generation for back-up supply when either the sun or wind are not available. Currently, renewable energy plants stop generating electricity when the supply of solar or wind energy is unavailable. Electric utilities switch their supply to consumers with electricity generated by conventional carbon-based fuel plants. It is important to highlight that relying on carbon-based fuels for back up maintains the generation and emissions of $CO_2$ into the atmosphere and, just as importantly, does not eliminate the carbon-based fuels infrastructure (i.e., mines, wells, pipelines, etc.). This infrastructure significantly contributes to the release of methane ($CH_4$) into the atmosphere, where the spectral absorption characteristics of $CH_4$ make it a much more impactful gas with a higher contribution to the earth's greenhouse effect than $CO_2$.

To avoid using carbon-based electricity generation for back up of renewable energy, some energy storage technologies are being considered. Two of the most relevant energy storage alternatives are batteries and hydrogen. The typical approach is to utilize excess electricity generation from renewable sources to store the energy in a battery or produce hydrogen via electrolysis.

Batteries are commonly discussed as a storage option for photovoltaic (PV) solar energy plants, although they could be applied to other renewable energy plants. Lithium-ion batteries are the most common alternative. Lithium-ion batteries have found wide acceptance for mobile phone and electric car applications, among others. However, the amount of energy they can store is typically only a few hours, making them an unreliable back-up system when the downtime exceeds more than four (4) hours. In addition, the cost of lithium-ion batteries needs to come down for them to be more competitive as a storage option and the availability of battery materials could become a problem in the future as electric cars and residential energy storage gain popularity. In addition, as batteries become more widespread, it cannot be discarded that some of the natural resources to manufacture them may not be sufficient to satisfy demand, as well as potential serious environmental concerns related to their disposal after their useful life.

Regarding hydrogen as an energy storage option, the most common approach being pursued is generating hydrogen via electrolysis with excess electricity from a renewable source, storing this hydrogen and then utilizing fuel cells as an electricity source when the renewable source is unavailable. Hydrogen powered fuel cell technology has been under development by various U.S. government institutions and private enterprises for more than 50 years and have recently found niche application in transportation (i.e., fuel cell powered buses) and small-scale electricity generation. However, broad implementation in large-scale electricity generation remains elusive due to scaling, high costs and reliability issues. Other electricity generation alternatives using hydrogen are being contemplated by some organizations. These include ammonia generation and oxidation, and hydrogen enriched natural gas for gas turbine applications. Although these approaches eliminate some $CO_2$, they would generate very large amounts of highly regulated air polluting nitrogen oxides ($NO_x$) which require post-combustion treatments such as Selective Catalytic Reduction (SCR) or Selective Non-Catalytic Reduction (SNCR). Although both SCR and SNCR are utilized in many electricity generation and industrial applications, their use of ammonia (a toxic air pollutant), or other toxic reagents, combined with high capital and operating costs make them less-than-ideal solutions to meet environmental regulations.

According to the U.S. Energy Information Administration (EIA), about 61% of the electricity generated in the U.S. comes from power plants using steam turbines. These may include conventional Rankine-cycle plants using fuels such as coal, natural gas and nuclear, as well as fossil-fuel-fired gas turbines with combined cycle steam turbines.

Conventional Rankine-cycle plants typically oxidize either coal or hydrocarbon fuels with air in a boiler (FIG. 1). The energy delivered by this exothermic reaction is used to generate high pressure steam which is in turn delivered to drive a steam turbine where a generator produces electricity.

Coal is inexpensive and abundant on Earth. Historically, it has been widely used worldwide for electricity generation and heating. Coal is composed primarily of carbon and contains various amounts of other contaminants such as inorganic material (ash), and sulfur, among others. When coal is burned, energy is released by the reaction of carbon with oxygen from air producing $CO_2$ as a reaction product. For every pound of carbon burned, a pound of $CO_2$ is released to the atmosphere. The large amounts of $CO_2$ generated by electricity generation with coal combustion have prompted many nations to reduce coal use as a primary target for curbing its impact on the concentration of greenhouse gases in the atmosphere. Unfortunately, despite these efforts, the worldwide use of coal continues to grow.

Similarly, many power plants have been built, or converted from coal, to burn natural gas with air as the energy source that generates the steam driving the turbine. Methane ($CH_4$) is the primary component of natural gas and when oxidized with air, it reacts into $CO_2$ and water vapor ($H_2O$). Emissions of $CO_2$ from methane combustion are only slightly higher than 50% those of coal on a per energy basis when compared with low-to-medium volatile bituminous coal with a heating value of 14,000 Btu/lb. Although electricity generation with natural gas represents quite an improvement in reducing the amount of $CO_2$ released to the atmosphere, it still represents millions of tons released to the atmosphere even if coal were to be completely replaced by natural gas, considering the amount of electricity generated worldwide. Another factor to be considered is the absorption spectrum characteristics of $CH_4$ which make it a much larger greenhouse gas contributor than $CO_2$. $CH_4$ release into the atmosphere by leakage from piping and compressor equipment in the distribution of natural gas is a recurring problem that needs to be eliminated or addressed more aggressively by industry to ameliorate climate change.

Hydrogen is abundant on the Earth's crust but occurs primarily as water. Very small quantities of pure hydrogen can be found in the atmosphere in the form of a diatomic molecule ($H_2$). Although $H_2$ is a fuel that does not contain carbon (its products of combustion are water alone), it must be manufactured by either steam methane reforming (SMR) or by water electrolysis. The combustion of hydrogen generated by electrolysis using electricity from renewable energy sources would eliminate emissions of $CO_2$.

The use of hydrogen for combustion applications presents challenges that with proper care and technology can be overcome. That is, it is a highly flammable gas which requires special handling during transportation and distribution for safe use. It also has a higher adiabatic flame temperature than other commonly used fuels such as methane, propane, coal, diesel, and Bunker C oil. Adiabatic flame temperatures for combustion systems with air as the oxidizer are relevant because the higher the flame temperature, the higher the emissions of nitrogen oxides (NOR). NO has been classified as a criteria pollutant (a precursor of photochemical smog) by the U.S. Clean Air Act and its Amendments, and it is highly regulated by air quality management districts, not only in the U.S. but throughout the world. NO is formed during the combustion process when nitrogen and oxygen in air react at high temperatures. Some fuel compositions contain either free nitrogen (e.g., $N_2$ in natural gas) or fuel-bound nitrogen (e.g., liquid or solid fuels) which can also contribute to the formation of NOR. Control of NO emissions has been the primary emphasis of the combustion industry over the last five decades. In addition, higher adiabatic flame temperatures like those found in $H_2$ combustion could shorten the life, or even create catastrophic failure, of metallic and ceramic components in burners, boilers, furnaces, heaters, etc. It is for these reasons (manufacturing cost, NO and equipment life) that pure $H_2$ has not found application as a fuel for electricity generation or industrial heating applications (e.g., process steam, refinery process heaters, steel manufacturing and treating, glass melting, etc.).

Some of the techniques used to control NO include flue gas recirculation (FGR), water injection, steam injection and fuel or air staging, among others. These techniques are used to reduce peak flame temperatures with the only purpose of reducing emissions of NOR. However, these techniques have not been used to reduce bulk flame temperatures with the primary objective of maintaining equipment life or eliminating equipment failure.

Climate change, combined with the increasing share of renewable energy technologies for electricity generation, have opened opportunities to reduce the cost of $H_2$ supply and its use in combustion to help eliminate emissions of greenhouse gases into the atmosphere.

It is therefore desirable to provide an improved system and process for electricity generation using steam production by hydrogen combustion.

It is further desirable to provide a Rankine Cycle system and process for the generation of electricity using a primary pure hydrogen fuel source for the generation of steam in the boiler system.

It is still further desirable to provide a Rankine Cycle system and process for the generation of electricity using a primary hydrogen fuel source for the generation of steam in the boiler system and one or more secondary fuel sources to reduce emissions of $CO_2$ and other greenhouse gases into the atmosphere.

It is yet further desirable to provide a Rankine Cycle system and process for the generation of electricity using a primary hydrogen fuel source for the generation of steam in the boiler system (alone or with one or more secondary fuel sources) and using at least one flame temperature reducing fluid to lower a bulk flame temperature of a burner in the boiler to reduce emissions of $CO_2$ and other greenhouse gases into the atmosphere.

It is still yet further desirable to provide a Rankine Cycle system and process for the generation of electricity wherein one or more of the boiler burners are configured to oxidize pure oxygen or oxygen enriched air (i.e., oxygen concentration greater than about 21% by volume) to reduce emissions of $NO_x$ and other greenhouse gases into the atmosphere.

Before proceeding to a detailed description of the invention, however, it should be noted and remembered that the description of the invention which follows, together with the accompanying drawings, should not be construed as limiting the invention to the examples (or embodiments) shown and described. Those skilled in the art to which the invention pertains will be able to devise other forms of this invention within the ambit of the appended claims.

SUMMARY OF THE INVENTION

In general, the invention relates to a system and process for electricity generation using steam production by hydrogen combustion. More particularly, the invention relates to a Rankine Cycle system and process for the generation of electricity using pure hydrogen as a primary fuel source for the generation of steam in the boiler system. The Rankine Cycle system and process may also use a mixture of the primary pure hydrogen fuel source with one or more secondary fuels, such as natural gas, methane, propane, or a mixture thereof, to reduce emissions of $CO_2$. Additionally, the inventive system and process can use a flame temperature reducing fluid for lowering a bulk flame temperature of a burner in the boiler system to reduce $CO_2$ emissions. The flame temperature reducing fluid can include flue gas recirculation (FGR), water injection, steam injection and a combination of two or all three of these fluids, among others. The inventive Rankine Cycle system and process reduce emissions of $CO_2$, NOR, and other greenhouse gases into the atmosphere, and the system and process also reduce bulk flame temperatures to increase equipment life and decrease equipment failure.

The foregoing has outlined in broad terms some of the more important features of the invention disclosed herein so that the detailed description that follows may be more clearly understood, and so that the contribution of the instant inventors to the art may be better appreciated. The instant invention is not to be limited in its application to the details of the construction and to the arrangements of the components set forth in the following description or illustrated in the drawings. Rather, the invention is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention.

BRIEF DESCRIPTION OF THE DRAWINGS

These and further aspects of the invention are described in detail in the following examples and accompanying drawings.

DETAILED DESCRIPTION OF THE INVENTION

Figure 1:
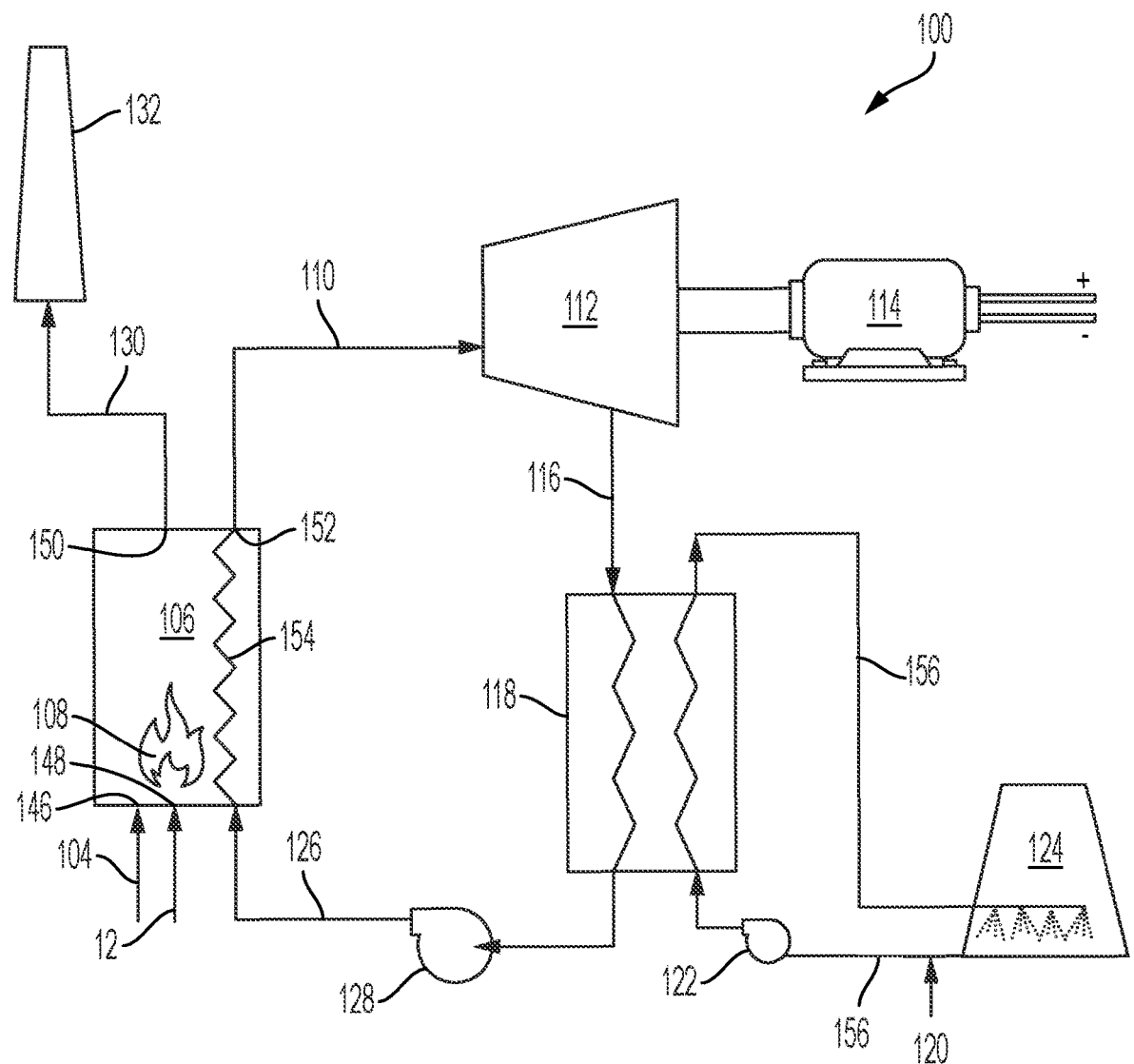
FIG. 1 is a schematic diagram of a conventional Rankine Cycle system and process for electricity generation using combustion of coal or hydrocarbon fuels with air in a boiler.

While this invention is susceptible of embodiment in many different forms, there is shown in the drawings, and will herein be described hereinafter in detail, some specific embodiments of the instant invention. It should be understood, however, that the present disclosure is to be considered an exemplification of the principles of the invention and is not intended to limit the invention to the specific embodiments so described.

This invention relates generally to a system and process for electricity generation using steam production by hydrogen combustion, and more particularly to a Rankine Cycle system and process for the generation of electricity using pure hydrogen as a primary fuel source for the generation of steam in the boiler system. Pure hydrogen herein as used herein means hydrogen with a purity higher than 99%. The Rankine Cycle system and process may also use a mixture of hydrogen with one or more secondary fuels to reduce emissions of carbon dioxide. Additionally, the inventive system and process can use a flame temperature reducing fluid for lowering bulk flame temperature of a burner or burners in the boiler system to increase equipment life and decrease equipment failure. The inventive Rankine Cycle system and process reduce emissions of carbon dioxide, nitrogen oxides, and other greenhouse gases into the atmosphere and reduce bulk flame temperatures to increase equipment life and decrease equipment failure.

Referring initially to FIG. 1, a conventional Rankine Cycle plant 100 oxidizes a primary coal or hydrocarbon fuel source 12 with an oxidizer source (e.g., air) 104 in a boiler 106 having one or more burners 108 and a heat exchanger 154. An oxidizer inlet 146 is positioned downstream of the oxidizer source, and a primary fuel inlet 148 is positioned downstream of the source of primary fuel source 12. The burner(s) 108 in the boiler 106 transfer heat to the water 126 flowing through the heat exchanger 154 for generating the high-pressure steam 110. The energy delivered by this exothermic combustion reaction is used to generate high pressure steam 110 that is discharged from a steam outlet 152 and delivered to drive a steam turbine 112 where a generator 114 produces electricity. In addition to the steam 110, the reaction generates flame and combustion products 130 that are discharged from a flame and combustion products outlet 150 and disposed of in a stack 132. Low pressure steam 116 exits the steam turbine 112 entering a condenser 118 and condenses to form liquid water 126, which pumped using pump 128 is fed back to the boiler 106 in a closed loop system. The low-pressure steam 116 indirectly exchanges heat in the condenser 118 using water 156 as a cooling medium. The cooling water 156 is sent to a plant's cooling towers 124 to remove the heat released by the low pressure steam 116 in the condenser 118. Cooling water 156 is circulated using feed pump 122 while make-up water 120 is fed into the cooling water loop to replace water lost due to evaporation in the cooling towers 124.

Figure 2:
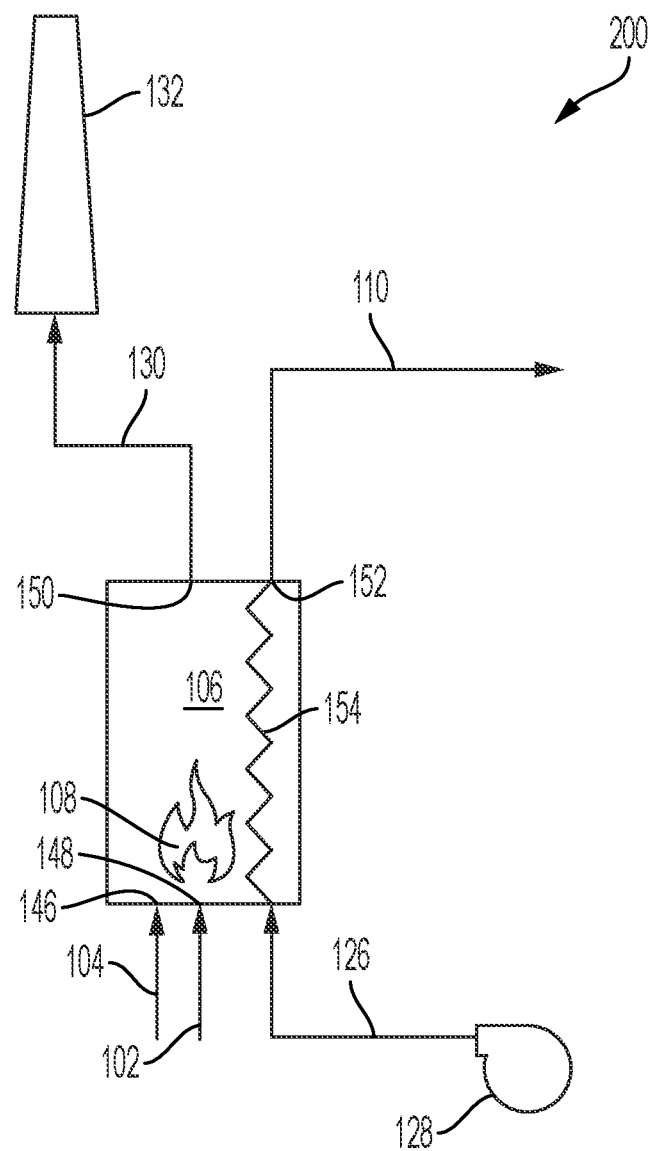
FIG. 2 is a schematic diagram of an example of a Rankine Cycle system and process for electricity generation using a pure hydrogen fuel source and a combustion air oxidizer in accordance with an illustrative embodiment of the invention disclosed herein.

Referring now to the FIGS. 2 through 13, wherein like numerals of reference designate like elements throughout the several views, and initially to FIG. 2, a Rankine Cycle system and process for electricity generation 200 that combusts a primary pure hydrogen ($H_2$) fuel source 102 with air 104 in a boiler 106 for the generation of steam 110 and flame and combustion products 130. Like the conventional Rankine Cycle plant in FIG. 1, low pressure steam 116 from the steam turbine 112 enters a condenser 118 and condenses to form liquid water 126, which pumped using pump 128 is fed back to the boiler 106 in a closed loop system. The low-pressure steam 116 indirectly exchanges heat in the condenser 118 using water 156 as a cooling medium. The cooling water 156 is sent to a plant's cooling towers 124 to remove the heat released by the low pressure steam 116 in the condenser 118. Cooling water 156 is circulated using feed pump 122 while make-up water 120 is fed into the cooling water loop to replace water lost due to evaporation in the cooling towers 124.

Figure 3:
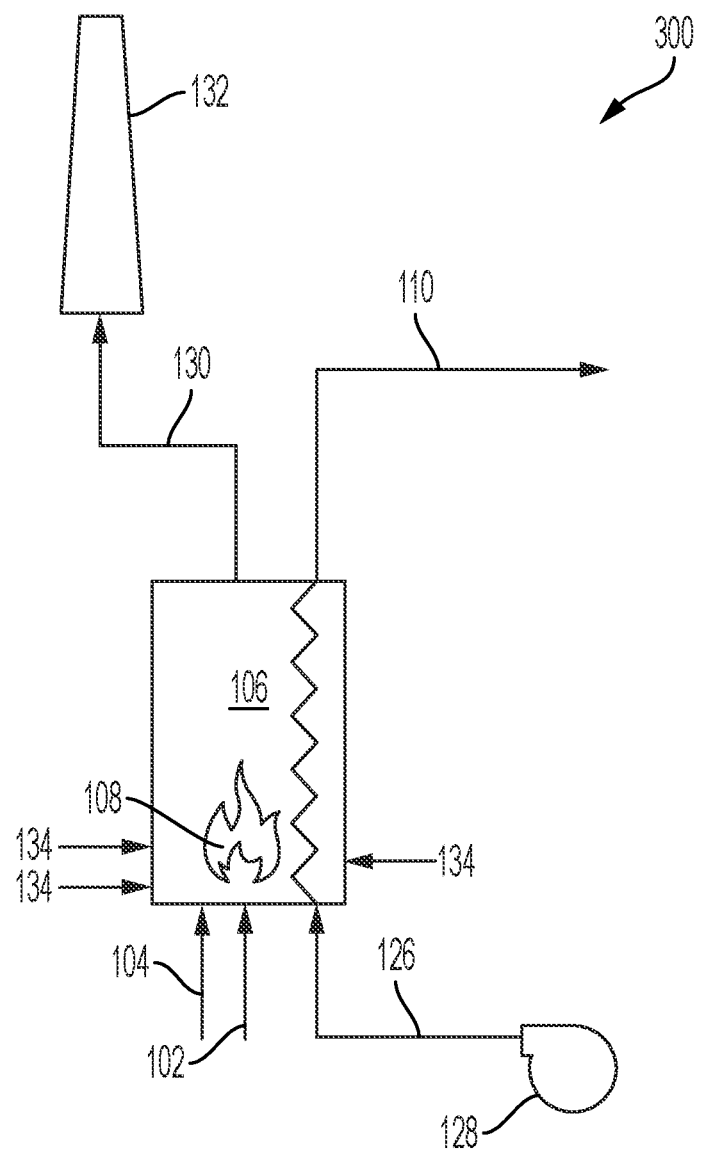
FIG. 3 is a schematic diagram of an example of a Rankine Cycle system and process for electricity generation using a pure hydrogen fuel source, a combustion air oxidizer, and a secondary fuel source in accordance with an illustrative embodiment of the invention disclosed herein.
Figure 4:
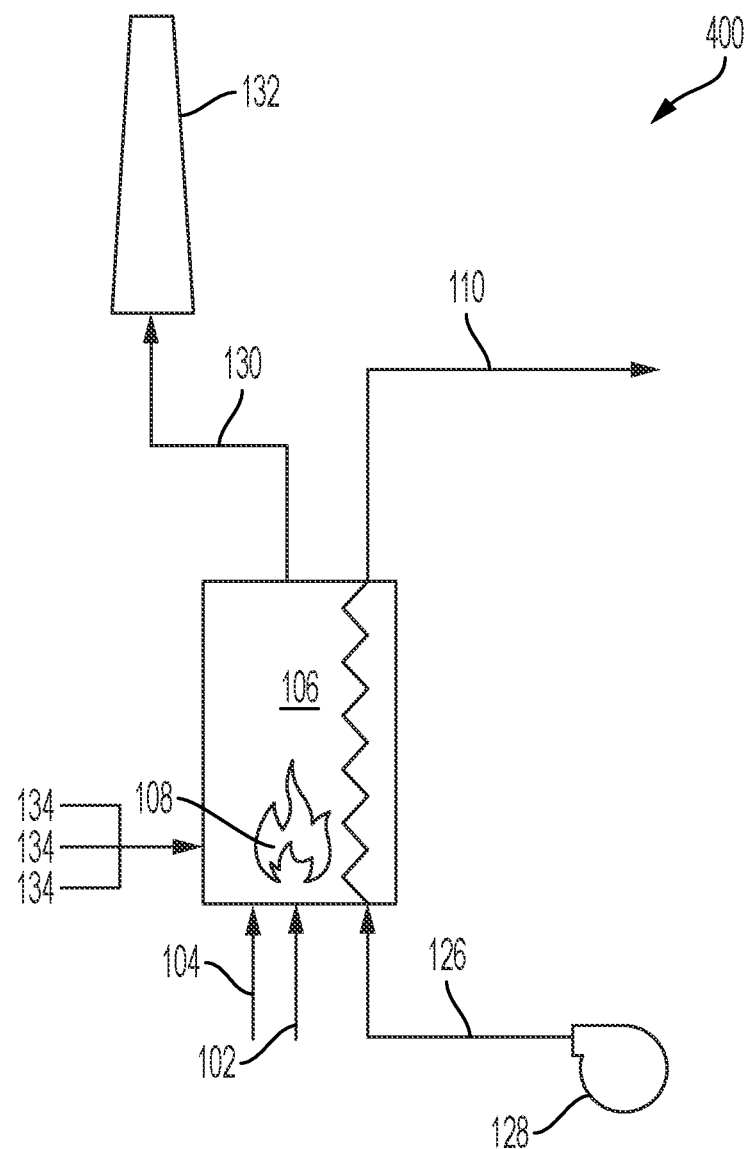
FIG. 4 is a schematic diagram of another example of a Rankine Cycle system and process for electricity generation using a pure hydrogen fuel source, a combustion air oxidizer, and a secondary fuel source in accordance with an illustrative embodiment of the invention disclosed herein.

As exemplified in FIGS. 3 and 4, the system and process 300/400 can combust a one or more secondary fuel sources 134 with the primary hydrogen fuel source 102 to supplement the primary pure hydrogen fuel 102 if necessary. The secondary fuel source(s) 134 can include natural gas, methane, propane, or mixtures thereof in compositions greater than about 5% by volume of the overall system 300/400 capacity. The secondary fuel source(s) 134 can be introduced to the boiler 106 in individual fluid streams (FIG. 3) or can be mixed into a single fluid stream (FIG. 4) before injection into the burner 108 of the boiler 106.

Figure 5:
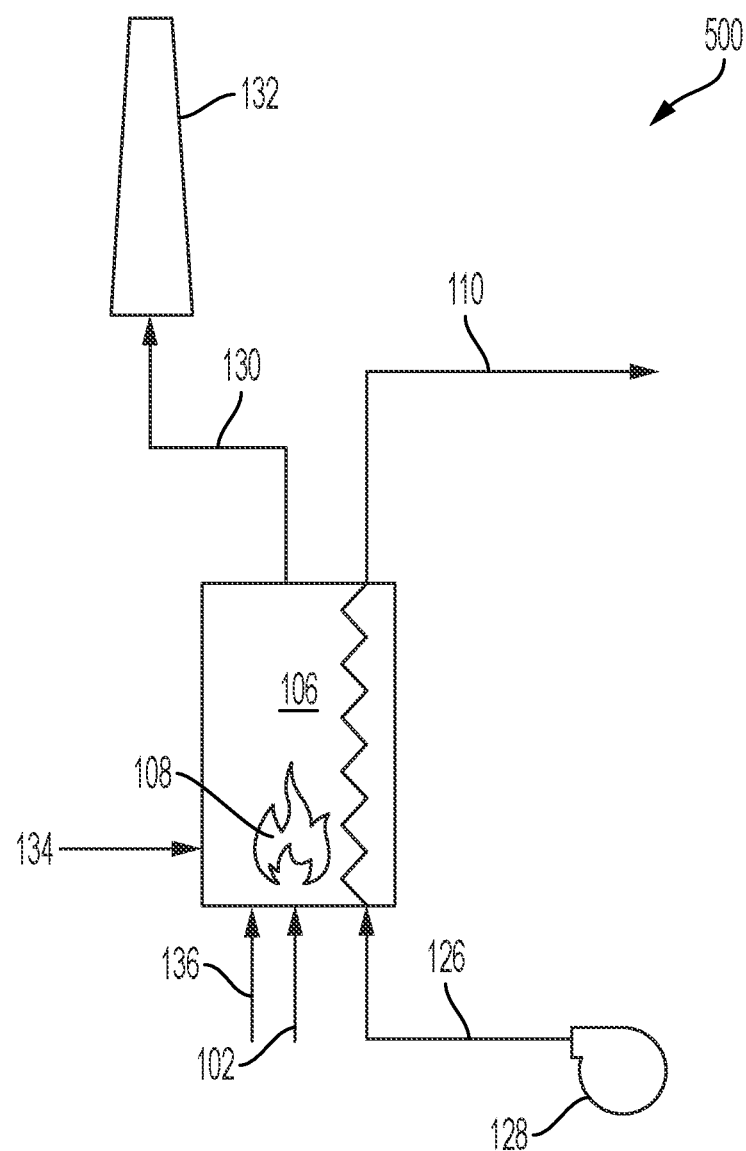
FIG. 5 is a schematic diagram of an example of a Rankine Cycle system and process for electricity generation using a pure hydrogen fuel source, a pure oxygen oxidizer, and a secondary fuel source in accordance with an illustrative embodiment of the invention disclosed herein.
Figure 6:
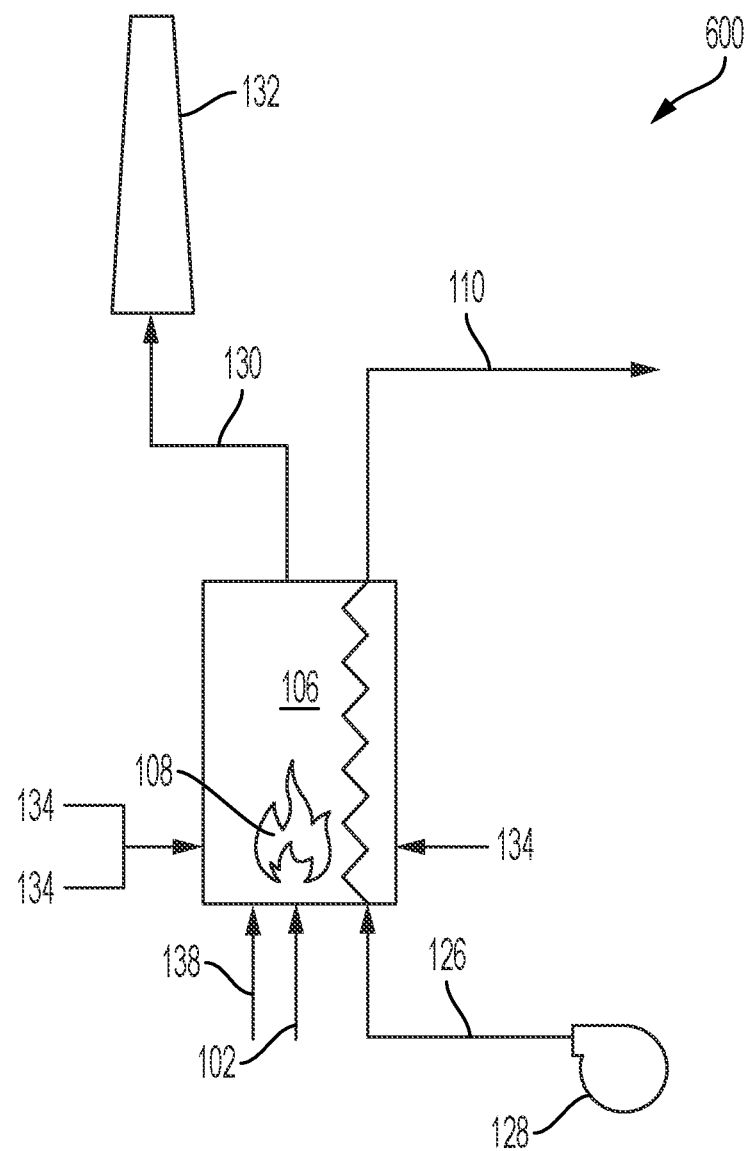
FIG. 6 is a schematic diagram of an example of a Rankine Cycle system and process for electricity generation using a pure hydrogen fuel source, an oxygen-enriched air oxidizer, and a plurality of secondary fuel sources in accordance with an illustrative embodiment of the invention disclosed herein.
Figure 7:
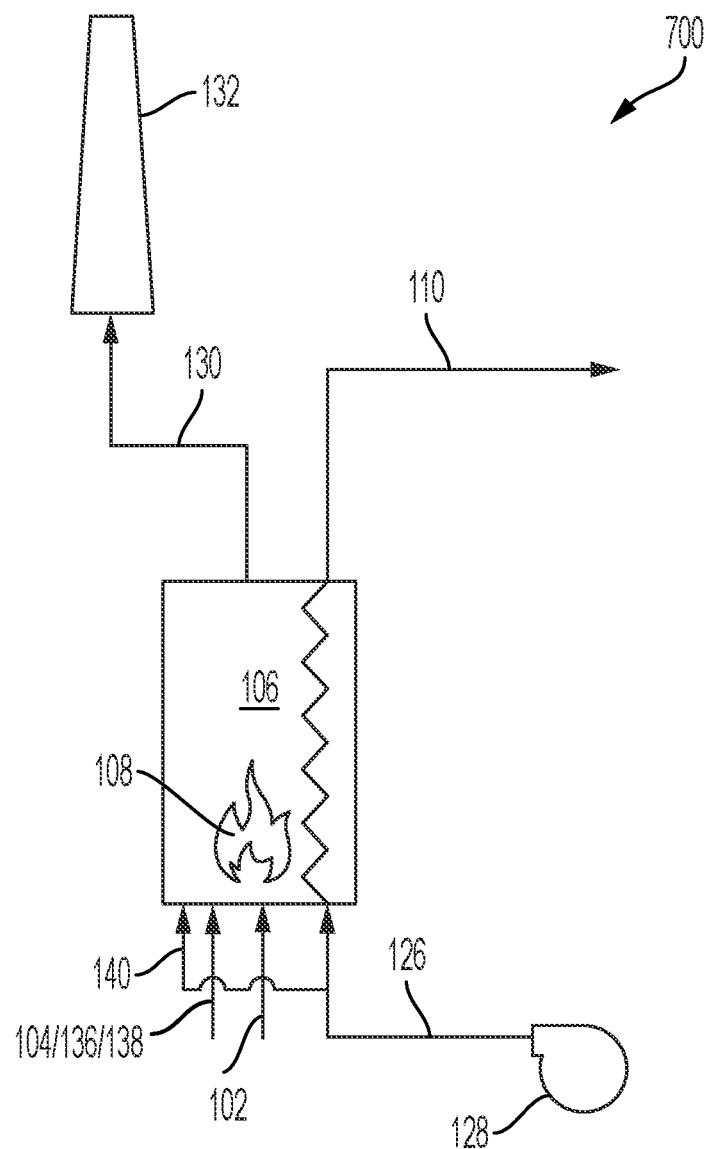
FIG. 7 is a schematic diagram of an example of a Rankine Cycle system and process for electricity generation using a pure hydrogen fuel source, an oxidizer, and water to lower a bulk flame temperature of the burner in accordance with an illustrative embodiment of the invention disclosed herein.
Figure 8:
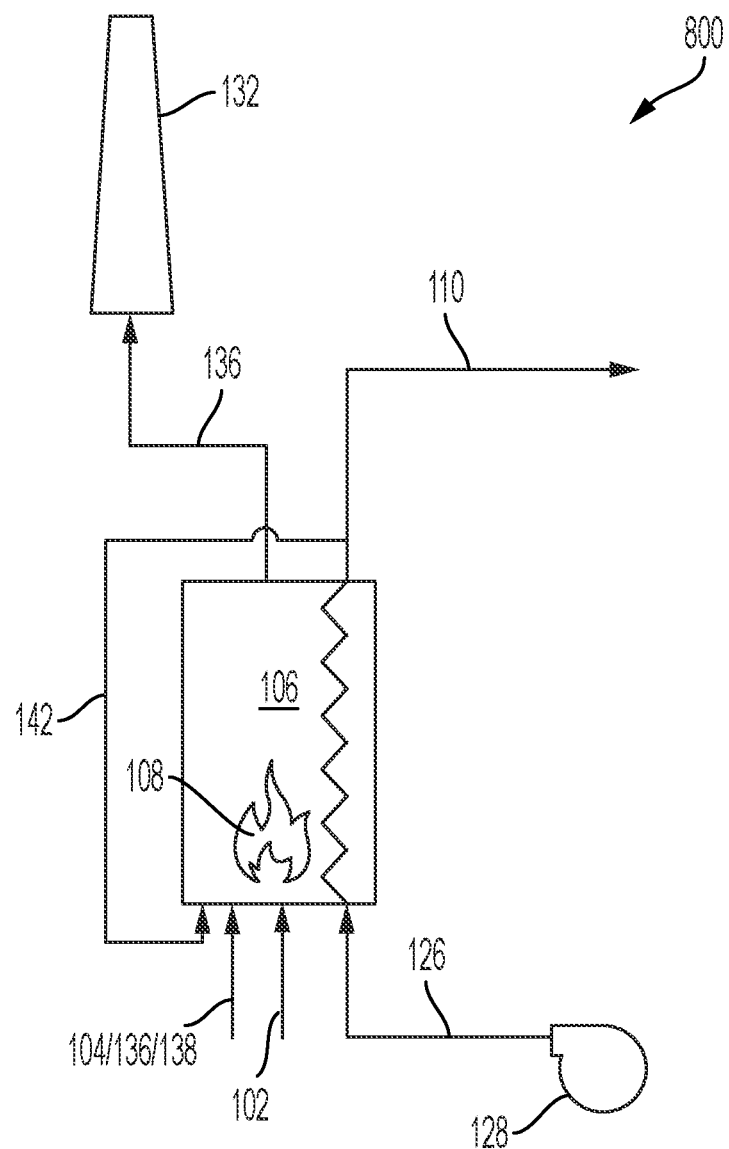
FIG. 8 is a schematic diagram of an example of a Rankine Cycle system and process for electricity generation using a pure hydrogen fuel source, an oxidizer, and steam output from the boiler to lower a bulk flame temperature of the burner in accordance with an illustrative embodiment of the invention disclosed herein.
Figure 9:
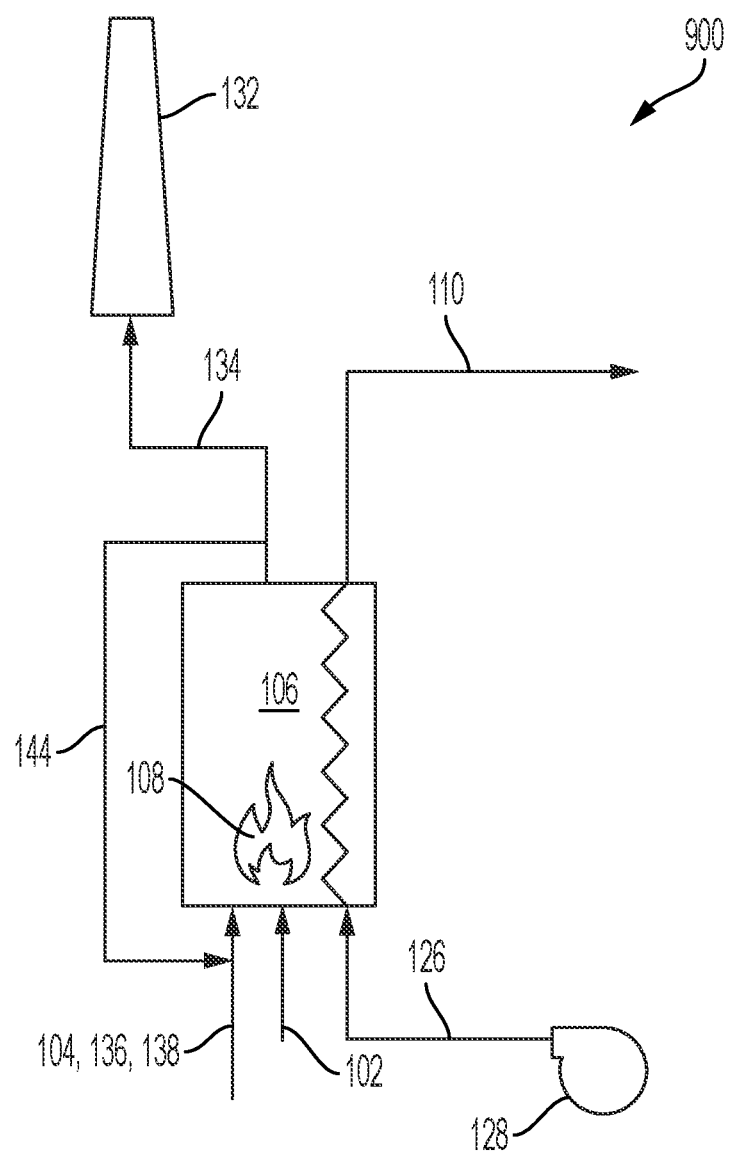
FIG. 9 is a schematic diagram of an example of a Rankine Cycle system and process for electricity generation using a pure hydrogen fuel source, an oxidizer, and flue gas from the boiler system is recirculated and injected to lower a bulk flame temperature of the burner in accordance with an illustrative embodiment of the invention disclosed herein.
Figure 10:
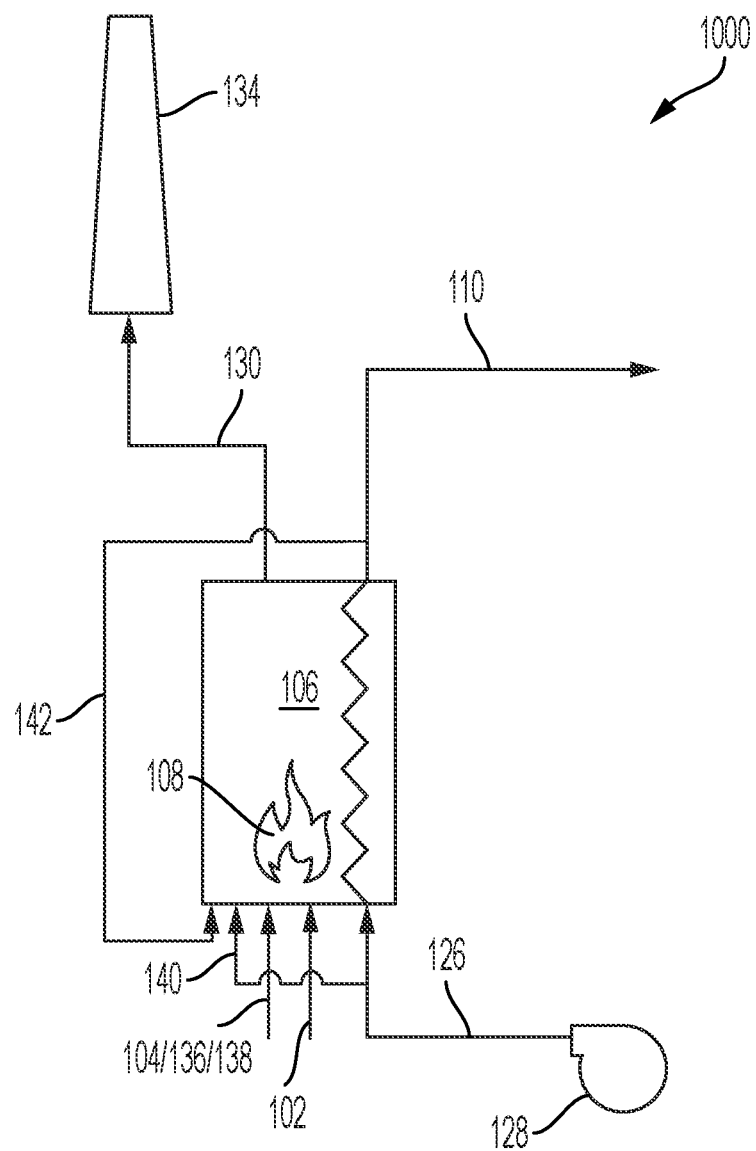
FIG. 10 is a schematic diagram of an example of a Rankine Cycle system and process for electricity generation using a pure hydrogen fuel source, an oxidizer, and water input to the boiler and steam output from the boiler are concurrently injected to lower a bulk flame temperature of the burner in accordance with an illustrative embodiment of the invention disclosed herein.
Figure 11:
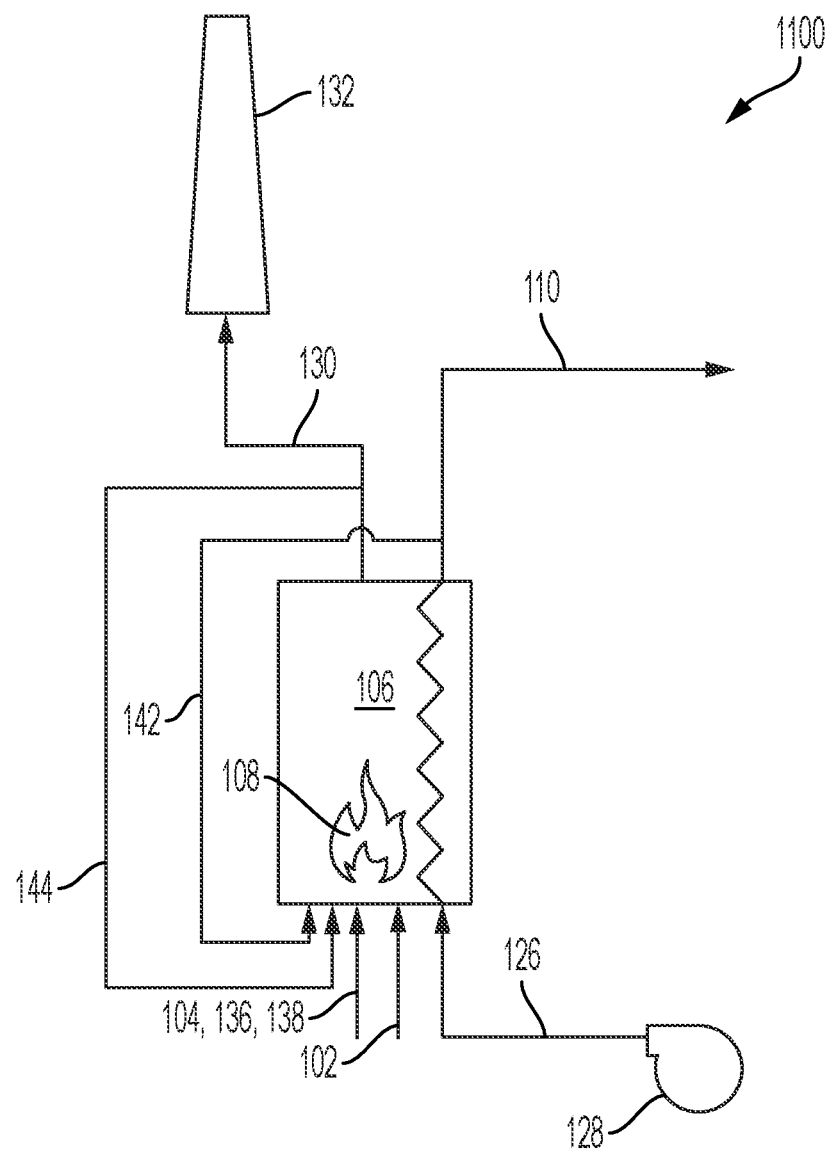
FIG. 11 is a schematic diagram of an example of a Rankine Cycle system and process for electricity generation using a pure hydrogen fuel source, an oxidizer, and steam output from the boiler and recirculated flue gas are concurrently injected to lower a bulk flame temperature of the burner in accordance with an illustrative embodiment of the invention disclosed herein.
Figure 12:
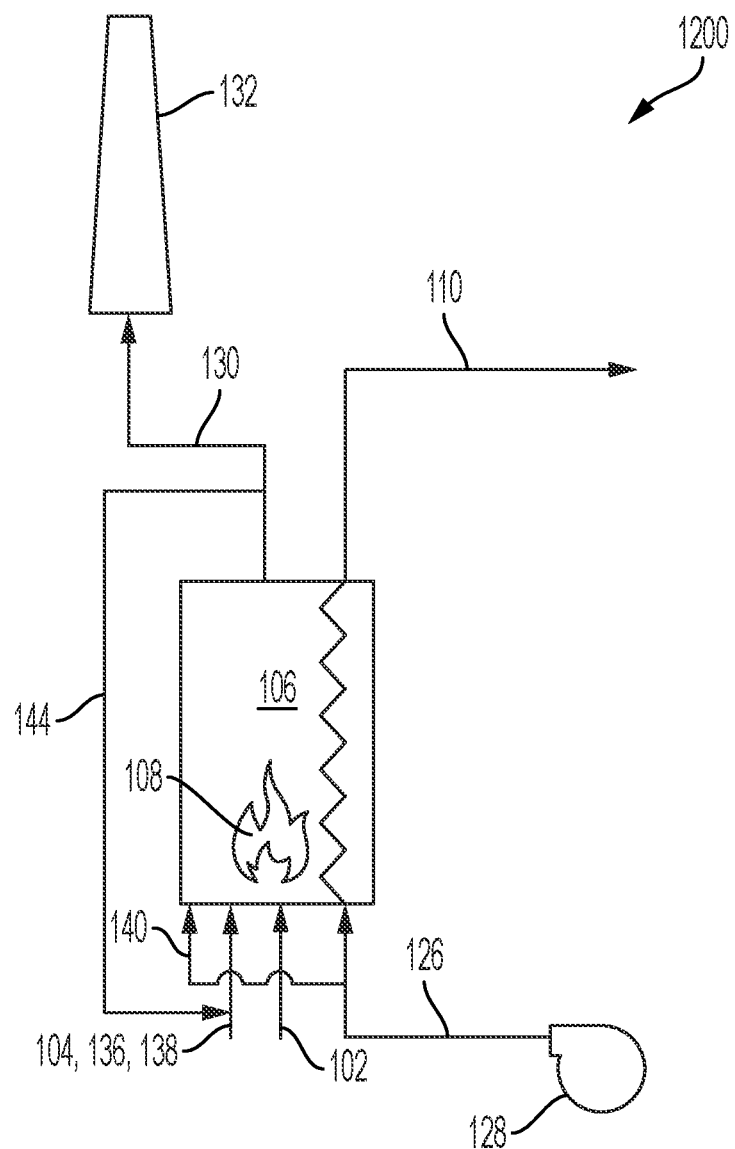
FIG. 12 is a schematic diagram of an example of a Rankine Cycle system and process for electricity generation using a pure hydrogen fuel source, an oxidizer, and water input to the boiler and recirculated flue gas are concurrently injected to lower a bulk flame temperature of the burner in accordance with an illustrative embodiment of the invention disclosed herein.
Figure 13:
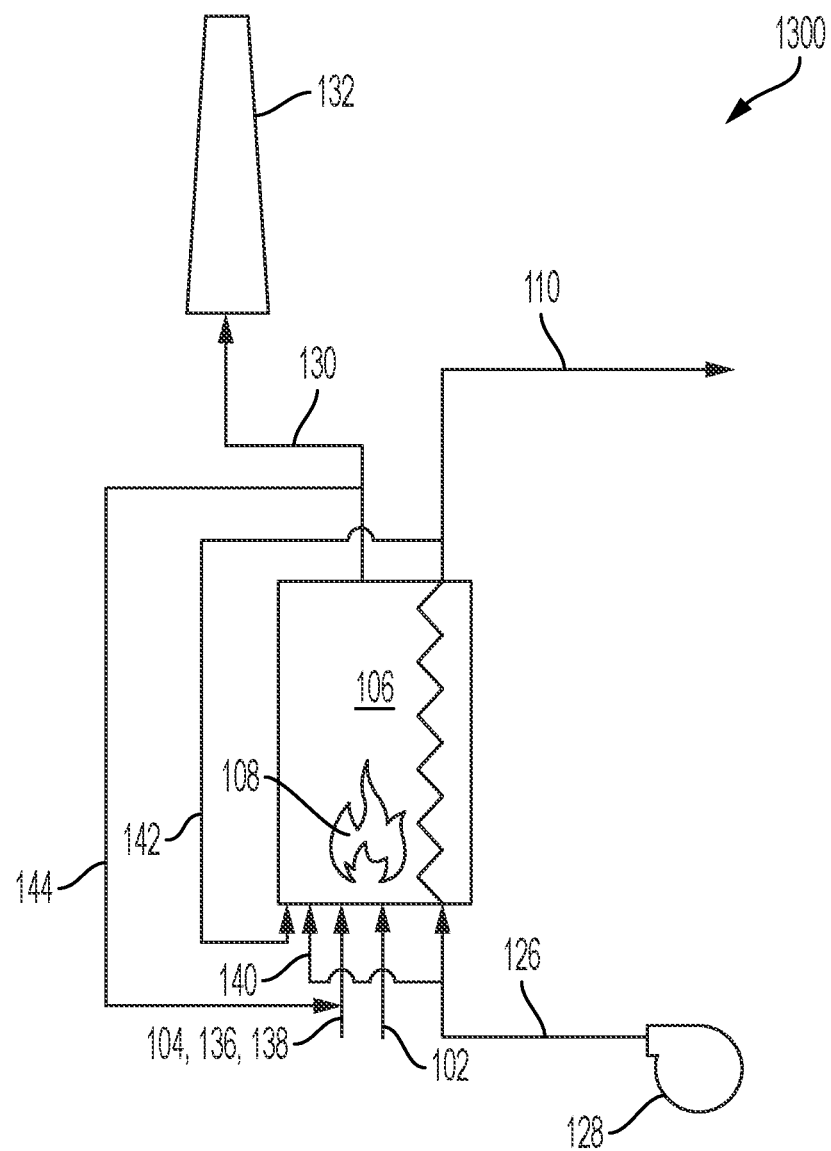
FIG. 13 is a schematic diagram of an example of a Rankine Cycle system and process for electricity generation using a pure hydrogen fuel source, an oxidizer, and water input to the boiler, steam output from the boiler, and recirculated flue gas are concurrently used to lower a bulk flame temperature of the burner in accordance with an illustrative embodiment of the invention disclosed herein.

As exemplified in FIGS. 5 and 6, one or more of the burners 108 of the boiler 106 of the system and process 500/600 can be configured to replace combustion air 104 with pure oxygen 136 to avoid $NO_x$ emissions, or configured to replace combustion air 104 with oxygen-enriched air 138 (i.e., oxygen concentration greater than about 21% by volume) with the objective of reducing overall oxygen cost, or in case pure oxygen is not available to satisfy the combustion capacity needs. In this exemplary embodiment of the system and process for electricity generation using steam 500, the primary hydrogen fuel source 102 and the secondary fuel source(s) 134, if present, are combusted with pure oxygen 136 (FIG. 5) or oxygen-enriched air 138 (FIG. 6) to reduce greenhouse gas emissions.

Turning now to FIGS. 7 through 13, the Rankine Cycle system and process can use at least one flame temperature reducing fluid to lower the bulk flame temperature of the burner(s) 108 in the boiler 106. The flame temperature reducing fluid can be water 140 diverted from the feed water 126 (FIG. 7) or another source; steam 142 output from the boiler steam stream 110 (FIG. 8) or another source; flue gas 144 from the flame and combustion product stream 134 recirculated and mixed with the oxidizing source, e.g., air 104, pure oxygen 136, or oxygen-enriched air 138, or otherwise injected into the burner 108 (FIG. 9); or a combination thereof (FIG. 10-13). The flame temperature reducing fluid 140, 142, and/or 144 is injected into or otherwise fluidly flowed to the burner(s) 108 of the boiler 106 to lower the bulk flame temperature during combustion of the primary hydrogen fuel source 102 (and the secondary fuel source 134, if present).

The flame temperature reducing fluid 140, 142, and/or 144 can be used separately or in conjunction with the secondary fuel source 134. The flame temperature reducing fluid 140, 142, and/or 144 can also be separately or concurrently injected into one or more of the burners 108 configured to combust pure oxygen 136 or oxygen-enriched air 138. In an exemplary embodiment of the system and process for electricity generation using steam, the primary hydrogen fuel source 102 and the secondary fuel source 134 are combusted with pure oxygen 136 or oxygen-enriched air 138 while the bulk flame temperature is lowered using the flame temperature reducing fluid 140, 142, and/or 144 in order to reduce $CO_2$ and $NO_x$ emissions and to increase equipment life and decrease equipment failure.

In addition, the system and process for electricity generation can include post-combustion $NO_x$ control technology, such as Selective Catalytic Reduction (SCR) or Selective Non-Catalytic Reduction (SNCR). The inventive Rankine Cycle system and process can also include on-site hydrogen fuel storage, which can be supplied for combustion in the boiler from either an electrolysis generator, a steam methane reforming (SMR) plant, or any other hydrogen manufacturing process. Moreover, the inventive Rankine Cycle system and process can include hydrogen liquid bulk deliveries to storage tanks with vaporization, or high-pressure hydrogen gas storage to be combusted in the boiler system. The primary hydrogen fuel source 102 can be supplied to the boiler 106 via a pipeline. The boiler 106 of the inventive system and process can be of any type of design, such as firetube, watertube, utility, single burner, multiple-burner, side-fired, bottom-fired, roof-fired, tangentially-fired, and either skid-mounted or field-erected, or a combination thereof.

It is to be understood that the terms "including", "comprising", "consisting of" and grammatical variants thereof do not preclude the addition of one or more components, features, steps, or integers or groups thereof and that the terms are to be construed as specifying components, features, steps, or integers.

If the specification or claims refer to "an additional" element, that does not preclude there being more than one of the additional element.

It is to be understood that where the claims or specification refer to "a" or "an" element, such reference is not to be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Systems and processes of the instant disclosure may be implemented by performing or completing manually, automatically, or a combination thereof, selected steps or tasks.

The term "process" may refer to manners, means, techniques and procedures for accomplishing a given task including, but not limited to, those manners, means, techniques and procedures either known to, or readily developed from known manners, means, techniques and procedures by practitioners of the art to which the invention belongs.

For purposes of the instant disclosure, the term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. Terms of approximation (e.g., "about", "substantially", "approximately", etc.) should be interpreted according to their ordinary and customary meanings as used in the associated art unless indicated otherwise. Absent a specific definition and absent ordinary and customary usage in the associated art, such terms should be interpreted to be ±10% of the base value.

When, in this document, a range is given as "(a first number) to (a second number)" or "(a first number)–(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a process comprising two or more defined steps, the defined steps can be carried out in any order or simultaneously (except where context excludes that possibility), and the process can also include one or more other steps which are carried out before any of the defined steps, between two of the defined steps, or after all of the defined steps (except where context excludes that possibility).

Still further, additional aspects of the instant invention may be found in one or more appendices attached hereto and/or filed herewith, the disclosures of which are incorporated herein by reference as if fully set out at this point.

Thus, the invention is well adapted to carry out the objects and attain the ends and advantages mentioned above as well as those inherent therein. While the inventive concept has been described and illustrated herein by reference to certain illustrative embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A system for electricity generation using hydrogen combustion, said system comprising a Rankine Cycle fluid recirculation loop (100), a condenser (118), a steam turbine (112) engaged with a generator (114) to generate the electricity, and a feed water pump (128) for circulating water (126) through the Rankine Cycle fluid recirculation loop (100), the system further comprising:
   a source of an oxidizer (104, 136, 138);
   a source of primary pure hydrogen ($H_2$) fuel (102); and
   a boiler (106), comprising:
      an oxidizer inlet (146) downstream from the source of oxidizer (104, 136, 138),
      a primary fuel inlet (148) downstream from the source of primary pure hydrogen fuel (102),
      at least one burner (108) configured to combust the primary pure hydrogen fuel (102) with the oxidizer (104, 136, 138) to produce flame and combustion products, and the burner (108) further configured to combust the primary pure hydrogen fuel (102) with the oxidizer (104, 136, 138) to generate high pressure steam (110),
      a combustion products outlet (150) adapted to discharge the combustion products (130) from the boiler (106),
      a heat exchanger (154) adapted to transfer heat from the flame and combustion products to the water (126) for generating the high-pressure steam (110), and
      a stream outlet (152) adapted to discharge the high-pressure steam (110) from the boiler (106).

2. The system of claim 1 wherein said boiler (106) is a firetube, watertube, utility, single burner, multiple-burner, side-fired, bottom-fired, roof-fired, tangentially-fired, skid-mounted, field-erected boiler, or a combination thereof.

3. The system of claim 1 further comprising a source of secondary fuel (134) configured to combust with the primary pure hydrogen fuel (102) and the oxidizer (104, 136, 138).

4. The system of claim 3 wherein the secondary fuel (134) is natural gas, methane, propane, or a combination or mixture thereof.

5. The system of claim 4 wherein the secondary fuel (134) has a concentration of greater than 5% by volume of the overall system capacity.

6. The system of claim 1 wherein the oxidizer (104, 136, 138) is combustion air (104), pure oxygen (136), or oxygen-enriched air (138).

7. The system of claim 6 wherein said oxygen-enriched air (138) comprises an oxygen concentration greater than about 21% by volume.

8. The system of claim 1 further comprising a flame temperature reducing fluid (140, 142, 144) configured to lower the bulk flame temperature of the burner (108) in the boiler (106).

9. The system of claim 8 wherein said flame temperature reducing fluid (140, 142, 144) is injected into said burner (108) with the primary pure hydrogen fuel (102) and/or the secondary fuel (134), with said oxidizer (104, 136, 138), or a combination thereof.

10. The system of claim 9 wherein the flame temperature reducing fluid is water (140) input into the boiler (106) or from another source and/or injected into the burner (108).

11. The system of claim 9 wherein the flame temperature reducing fluid is steam (142) output from the boiler (106) or from another source and/or injected into the burner (108).

12. The system of claim 9 wherein the flame temperature reducing fluid is flue gas (144) recirculated to the boiler (106) and/or injected into the burner (108).

13. The system of claim 1 further comprising a post-combustion $NO_x$ control technology.

14. The system of claim 13 wherein the post-combustion $NO_x$ control technology is selective catalytic reduction (SCR) or selective noncatalytic reduction (SNCR).

15. The system of claim 1 further comprising at least one storage tank and/or facility for storing the hydrogen fuel, the secondary fuel, the oxidizer, or a combination thereof.

16. The system of claim 15 wherein the primary hydrogen fuel (102), the secondary fuel (134), the oxidizer (104, 136, 138), or a combination thereof is supplied to the boiler (106) via one or more pipelines.

17. The system of claim 1 further comprising a hydrogen ($H_2$) supply for combustion in the boiler (106) from either an electrolysis generator, a steam methane reforming (SMR) plant, or other $H_2$ manufacturing process.

18. A Rankine Cycle process for generating electricity using the system of claim 1.

19. A Rankine Cycle electricity generating plant using the system of claim 1.

20. A Rankine Cycle electricity generating process, comprising the step circulating water (126) through the Rankine Cycle fluid recirculation loop, said recirculation loop comprising a boiler (106) having at least one burner (108) and at least one heat exchanger (154), a condenser (118), a steam turbine (112) engaged with a generator (114) to generate the electricity, and a feed water pump (128) for circulating the water (126) through the Rankine Cycle fluid recirculation loop; the process further comprising the steps of:
heating the water (126) circulating through the heat exchanger (154) of the boiler (106) of the Rankine Cycle fluid recirculation loop by combusting a primary pure hydrogen fuel (102) with an oxidizer (104, 136, 138) using the burner (108);
wherein the combusting the primary pure hydrogen (102) with the oxidizer (104, 136, 138) produces flame and combustion products; and
wherein the combusting the primary pure hydrogen fuel (102) with the oxidizer (104, 136, 138) using the burner (108) generates high pressure steam (110), which drives the steam turbine (112) engaged with the generator (114) to generate the electricity.

21. The process of claim 20 wherein said boiler (106) is a firetube, watertube, utility, single burner, multiple-burner, side-fired, bottom-fired, roof-fired, tangentially-fired, skid-mounted, field-erected boiler, or a combination thereof.

22. The process of claim 21 further comprising the step of combusting a source of secondary fuel (134) with the primary pure hydrogen fuel (102) and the oxidizer (104, 136, 138).

23. The process of claim 22 wherein the secondary fuel (134) is natural gas, methane, propane, or a combination or mixture thereof.

24. The process of claim 23 wherein the secondary fuel (134) has a concentration of greater than 5% by volume of the overall system capacity.

25. The process of claim 20 wherein the oxidizer (104, 136, 138) is combustion air (104), pure oxygen (136), or oxygen-enriched air (138).

26. The process of claim 25 wherein said oxygen-enriched air (138) comprises an oxygen concentration greater than about 21% by volume.

27. The process of claim 20 further comprising the step of lowering the bulk flame temperature of the burner (108) in the boiler (106) with a flame temperature reducing fluid (140, 142, 144).

28. The process of claim 27 further comprising the step of injecting the flame temperature reducing fluid (140, 142, 144) into the burner (108) with the primary pure hydrogen fuel (102) and/or the secondary fuel (134), with said oxidizer (104, 136, 138), or a combination thereof.

29. The process of claim 28 wherein the flame temperature reducing fluid is water (140) input into the boiler (106) or from another source and/or injected into the burner (108).

30. The process of claim 28 wherein the flame temperature reducing fluid is steam (142) output from the boiler (106) or from another source and/or injected into the burner (108).

31. The process of claim 28 wherein the flame temperature reducing fluid is flue gas (144) recirculated to the boiler (106) and/or injected into the burner (108).

32. The process of claim 20 further comprising a post-combustion $NO_x$ control technology.

33. The process of claim 32 wherein the post-combustion $NO_x$ control technology is selective catalytic reduction (SCR) or selective noncatalytic reduction (SNCR).

34. A Rankine Cycle electricity generating plant using the process of claim 20.

35. A system for electricity generation using hydrogen combustion, said system comprising a Rankine Cycle fluid recirculation loop (100), a condenser (118), a steam turbine (112) engaged with a generator (114) to generate the electricity, a feed water pump (128) for circulating water (126) through the Rankine Cycle fluid recirculation loop (100), a boiler (106) comprising at least one burner (108) configured to transfer heat to the water (126) circulating through a heat exchanger (154) of the boiler (106), the system further comprising:
an oxidizer (104, 136, 138) comprising combustion air (104), pure oxygen (136), or oxygen-enriched air (138);
a primary pure hydrogen ($H_2$) fuel (102);
a secondary fuel (134) configured to combust with the primary pure hydrogen fuel (102) and the oxidizer (104, 136, 138) in the burner (108) of the boiler (106; and
a flame temperature reducing fluid (140, 142, 144) configured to lower the bulk flame temperature of the burner (108) in the boiler (106).

36. The system of claim 35 wherein said boiler (106) is a firetube, watertube, utility, single burner, multiple-burner, side-fired, bottom-fired, roof-fired, tangentially-fired, skid-mounted, field-erected boiler, or a combination thereof.

37. The system of claim 35 wherein the secondary fuel (134) is natural gas, methane, propane, or a combination or mixture thereof.

38. The system of claim 37 wherein the secondary fuel (134) has a concentration of greater than 5% by volume of the overall system capacity.

39. The system of claim 35 wherein said oxygen-enriched air (138) comprises an oxygen concentration greater than about 21% by volume.

40. The system of claim 35 wherein said flame temperature reducing fluid (140, 142, 144) is injected into said burner (108) with the primary pure hydrogen fuel (102) and/or the secondary fuel (134), with said oxidizer (104, 136, 138), or a combination thereof.

41. The system of claim 40 wherein the flame temperature reducing fluid is water (140) input into the boiler (106) or from another source and/or injected into the burner (108).

42. The system of claim 40 wherein the flame temperature reducing fluid is steam (142) output from the boiler (106) or from another source and/or injected into the burner (108).

43. The system of claim 40 wherein the flame temperature reducing fluid is flue gas (144) recirculated to the boiler (106) and/or injected into the burner (108).

44. The system of claim 35 further comprising a post-combustion $NO_x$ control technology.

45. The system of claim 44 wherein the post-combustion $NO_x$ control technology is selective catalytic reduction (SCR) or selective noncatalytic reduction (SNCR).

* * * * *